Patented Dec. 31, 1940

2,227,146

UNITED STATES PATENT OFFICE 2,227,146

ELECTROLYTE AND ELECTRIC CONDENSER MADE THEREWITH

Ludwig Linder, Berlin-Spandau, Germany, assignor, by mesne assignments, to Radio Patents Corporation, a corporation of New York, trustee No Drawing. Application January 2, 1936, Serial No. 57,247. In Germany January 3, 1935

4 Claims. (Cl. 175—315)

This invention relates to electrolytes for use in electrolytic condensers, and condensers made therewith.

More particularly, this invention refers to electrolytes containing dissociated components consisting of weak acids, or salts thereof, or ester-like compounds.

It is an object of this invention to increase the range of the buffering action of the electrolyte.

It is another object of this invention to increase the capacity of the electrolyte to form an anodic layer.

It is another object of this invention to render the condenser capable for use at high peak voltages.

According to this invention the electrolyte contains, or consists of, substances forming, or apt to form, hybrid-ions. Hybrid-ions are such ions which carry positive and negative charges simultaneously.

Thus, e. g. aminoacetic acid forms when dissolved ions of the form $+NH_3.CH_2.COO-$ (cf. Niels Bjerrum, "Zeitschrift für physikalische Chemie", vol. 104, 1923, page 147 and following).

The use of such substances offers various adtages. The electrolyte is rendered thereby capable of buffering within wider ranges. Furthermore, it forms easier, and in a better way, the anodic layer. Furthermore the electrolyte and condensers made therewith become apt for particularly high peak voltages.

The inventor does not want to confine himself to any scientific explanation of the effect of his invention. It seems, however, that these favorable properties are caused by the increased readiness of hybrid-ions to be polarized in comparison with neutral molecules.

This invention particularly uses the following groups of chemical combinations as such, or their derivatives, or other compounds of them:

(1) Solutions of aliphatic amino acids, or their salts, or their esters, with a monovalent or multivalent alcohol. In particular, mixtures of the acids or esters with their alkali salts, preferably their ammonium salts, may be employed.

*Example I.*—100 grams of glycerine (of a specific density of 1.23) are heated to about 50–60° C., whereupon about 9 grams of aminoacetic acid (glycocoll) are added. In order to dissolve these ingredients more rapidly and to get a stable solution, preferably about 12 grams formaline (DAB6) are added. This solution is ready for use as electrolyte. Instead of glycerine, equivalent quantities of other alcohols, such as glycols, may be employed. Instead of glycocoll, other aminoacetic acids, such as glycine or alanine, may be employed.

*Example II.*—10 grams of glycocollethyl-ester are dissolved in 100 grams alcohol, such as ethylene-glycol.

The glycocollethyl-ester can be prepared according to the data of "Berichte der Deutschen chemischen Gesellschaft" volume 34, 1901, page 436.

This solution may be used alone as electrolyte, or it may be mixed with a solution according to Example I, ratio for example 1: 1.

(2) Solutions of esters, preferably boric acid esters, with monovalent or multivalent amino alcohols. Both, acid and neutral esters may be employed. For instance, esters of boric acid and amino glycols can be used. The amino glycols may be prepared from amino acid esters according to the method of Paal and Weidenkaff ("Berichte der Deutschen chemischen Gesellschaft," 39th year, 1906, page 4344–4346). There may be used, however, any other suitable method for preparing amino alcohols, such as the synthesis from ethylene oxide.

*Example III.*—Tetraphenyl-amino-butylenegly-col $HO.(C_6H_5)_2C.CH(NH_2).CH_2.C(C_6H_5)_2.OH$ is prepared according to the method of Paal and Weidenkaff, and then dissolved in an alcohol, such as glycerine. Solutions containing about 5–20% of the first mentioned substance may be employed, to which up to about 30% boric acid is added.

Heat or vacuum, or heat and vacuum, may be applied advantageously facilitating reactions, such as esterification, which render the electrolyte more active and efficient.

(3) Solutions of p amino benzoic acid derivatives, the p- or m-form of the acid itself, however, does not develop hybrid-ions (comp. "Zeitschrift fuer Physikalische Chemie," July 1936, pages 100, 105, 106), particularly benzbetaines, may be employed.

*Example IV.*—15 grams anthranilic acid (orthoamino benzoic acid) are dissolved in 100 grams of a bivalent alcohol, such as diethyleneglycol (polyglycol), and 2cm.³, or more, of 25% aqueous ammonia are then added. The solution may be heated, so as to remove any excess of water to the greatest possible extent.

(4) Solutions of sulfo acids, particularly aminobenzene sulfo acids. In the foregoing, some important classes of chemical combinations are referred to which form hybrid-ions. They may be employed as substantial part of the electrolyte, or the entire electrolyte may consist exclusively of one or more of them.

The invention, however, is not confined to any such substance, or combinations of substances, referred to hereinbefore by way of examples only, but is to be understood in its broadest aspect from the appended claims.

As an example of preparing an electrolyte from other substances than mentioned above, the following may be referred to:

*Example V.*—About 1 gram sulfanilic acid is dissolved in 100 grams of water. Thereupon a sodium salt of sulfanilic acid is added in an amount sufficient to give the electrolyte the desired electrical conductivity.

Any such electrolyte is filled then into the desired device, such as an electrolytic condenser. There may be impregnated the body of the condenser with such an electrolyte, or its components, and the combinations of the latter one may be caused within said body. Any other suitable method of impregnating and/or manufacturing the condenser utilizing the electrolyte according to this invention may be used.

What I claim is:

1. An electrolyte for electrolytic condensers containing a substantial amount of a hybrid ions forming solution of boric acid ester in amino alcohol selected from a group consisting of the mono- and multivalent amino alcohols.

2. An electrolytic condenser the electrolyte of which contains a substantial amount of a hybrid ions forming solution of boric acid ester in amino alcohol selected from a group consisting of the mono- and multivalent amino alcohols.

3. An electrolyte for electrolytic condensers containing substantial amounts of a hybrid ions forming solution of esters in an amino-alcohol, said ester selected from acid and neutral esters.

4. An electrolytic condenser the electrolyte of which contains substantial amounts of a hybrid ions forming solution of esters in an amino-alcohol, said ester selected from acid and neutral esters.

LUDWIG LINDER.